United States Patent [19]

Mueller-Hess et al.

[11] Patent Number: 5,206,113
[45] Date of Patent: Apr. 27, 1993

[54] GRAFT POLYMER WITH UNSATURATED LATERAL CHAINS, PHOTOSENSITIVE MIXTURE CONTAINING SAID GRAFT POLYMER AND RECORDING MATERIAL PRODUCED THEREFROM

[75] Inventors: Waltraud Mueller-Hess, Wiesbaden; Dieter Mohr, Budenheim; Matthias Kroggel, Kelkheim, all of Fed. Rep. of Germany

[73] Assignee: Hoechst Aktiengesellschaft, Frankfurt am Main, Fed. Rep. of Germany

[21] Appl. No.: 575,642

[22] Filed: Aug. 31, 1990

[30] Foreign Application Priority Data

Aug. 31, 1989 [DE] Fed. Rep. of Germany ....... 3928825

[51] Int. Cl.$^5$ .................. C08F 2/48; C08F 283/04; G03C 1/492; G03C 1/494
[52] U.S. Cl. .................... 430/270; 522/32; 522/96; 522/149; 525/454; 430/287
[58] Field of Search ............ 522/96, 32, 149; 525/454; 430/287, 270

[56] References Cited

U.S. PATENT DOCUMENTS

| 3,705,164 | 12/1972 | Honig et al. | 525/454 |
|---|---|---|---|
| 4,272,620 | 6/1981 | Ichimura | 525/61 |
| 4,339,524 | 7/1982 | Ichimura et al. | 430/270 |
| 4,517,277 | 5/1985 | Lynch et al. | 430/281 |
| 4,564,580 | 1/1986 | Ichimura et al. | 430/281 |
| 4,707,437 | 11/1987 | Walls et al. | 430/273 |
| 4,840,868 | 6/1989 | Pawlowski et al. | 522/32 |
| 4,891,300 | 1/1990 | Ichimura et al. | 522/149 |
| 5,034,475 | 7/1991 | Kroggel et al. | 525/455 |

FOREIGN PATENT DOCUMENTS

| 0130804 | 1/1985 | European Pat. Off. |
| 0025210 | 3/1981 | Fed. Rep. of Germany |
| 3732089 | 4/1989 | Fed. Rep. of Germany |
| 62-246047 | 10/1987 | Japan |

Primary Examiner—Marion E. Mc Camish
Assistant Examiner—Susan Berman
Attorney, Agent, or Firm—Foley & Lardner

[57] ABSTRACT

Disclosed is a graft polymer comprising a polyurethane graft backbone and grafted-on chains comprising vinyl alcohol units and units with lateral styrylpyridinium or styrylquinolinium groups, and also a photocurable mixture comprising the graft polymer and a photosensitive compound, such as a photosensitizer of a negative-working diazo compound. The mixture is suited for the production of printing plates, in particular planographic printing plates, and photoresists. Printing plates prepared from the mixture are distinguished by high photospeed, good developability with aqueous solutions and long print runs.

28 Claims, No Drawings

GRAFT POLYMER WITH UNSATURATED LATERAL CHAINS, PHOTOSENSITIVE MIXTURE CONTAINING SAID GRAFT POLYMER AND RECORDING MATERIAL PRODUCED THEREFROM

BACKGROUND OF THE INVENTION

The instant invention relates to a graft polymer with ethylenically unsaturated, crosslinkable lateral chains and to a photocurable mixture, comprising said graft polymer and a photosensitive substance, which can be developed with aqueous solutions. The mixture is suited for the production of photosensitive recording materials, in particular planographic printing plates and photoresists.

Photosensitive mixtures comprising polyvinyl alcohols with photocrosslinkable side groups are known. U.S. Pat. No. 4,272,620 discloses a polyvinyl alcohol with lateral styrylpyridinium groups, which is distinguished by a high solubility in water and high photosensitivity. This alcohol is suited for protective coatings and screen printing stencils. U.S. Pat. No. 4,339,524 describes photosensitive resins which are suitable, in particular, for the production of luminescent screens or fluorescent screens of cathode ray tubes. The compounds are partially saponified polyvinyl acetates which in addition to acetal-type-bonded stilbazolium groups (=styrylpyridinium groups) carry ordinary acetal groups. From EP-A 0,130,804 a photosensitive mixture is known which contains a water-soluble saponified polyvinyl acetate with styrylpyridinium groups or styrylquinolinium groups, a water-dispersible polymer, a polymerizable unsaturated compound and a photoinitiator. The components are employed in the form of aqueous emulsions or dispersions and are suited for the production of printing plates, especially of screen printing stencils. EP-A 0,025,210 is also directed to a photosensitive mixture which contains a polyvinyl alcohol reacted with styrylpyridinium or styrylquinolinium groups and which is particularly suited for the production of screen printing stencils.

The resins described in the above publications are distinguished by high photosensitivity. They suffer, however, from the drawback that due to their low resistance to water even the hardened layer areas swell when development is performed with aqueous solutions, which seriously impairs image resolution.

This drawback cannot be avoided by an increased crosslinking density, for the incorporation of additional styrylpyridinium or styrylquinolinium groups on the one hand results in an increase in viscosity to the extent that coating of aluminum foils, for example, is no longer possible. On the other hand, the resistance to water is not sufficiently increased. This may be attributable to the presence of quaternary ammonium salt groups or to the fact that the degree of photodimerization cannot be arbitrarily increased by increasing the number of possible crosslinking points.

In DE-A 37 32 089 graft polymers are described, which comprise a polyurethane as the graft backbone and grafted-on vinyl ester units, which are at least partially saponified to give vinyl alcohol units. The polymers are suitable as binders for pigments; for preparing printing inks, thermoplastic adhesives and solvent-containing adhesives; as constituents of varnishes or coatings for fibers, films and metals, and for thermoplastic shaped articles.

Prior German Patent Application P 38 35 840.9 describes graft polymers which are obtained from the graft polymers described in DE-A 37 32 089 by acetalization with saturated aliphatic or aromatic aldehydes.

Prior German Patent Application P 39 20 229.1 describes photopolymerizable mixtures in which the graft polyvinyl acetals described in P 38 35 840.9 are contained as binders.

Prior German Patent Application P 39 24 811.9 describes photocurable graft polymers which are obtained from the polymers according to DE-A 37 32 089 by reacting them with activated derivatives of compounds having terminal vinyl or vinylidene groups, for example, derivatives of acrylic or methacrylic acid. These photocurable polymers are used in the production of printing plates or photoresists, in combination with photoinitiators and, optionally, free radically polymerizable low molecular weight compounds.

SUMMARY OF THE INVENTION

Accordingly, it is an object of the present invention to provide a polymer which is crosslinkable upon exposure, developable after imagewise exposure with water or aqueous solutions and highly resistant in the exposed state to aqueous processing solutions.

Another object of the present invention is to provide a polymer which is easy to prepare, possesses a higher photospeed than known materials of analogous composition and gives images of high resolution and long print runs.

A further object of the present invention is to provide a photocurable mixture having the foregoing properties which is suited for the production of printing plates, in particular planographic printing plates, as well as photoresists.

Yet another object of the present invention is to provide a photocurable recording material that comprises a photosensitive recording layer comprising the above-described photocurable mixture.

In accomplishing the foregoing objectives, there has been provided, in accordance with one aspect of the present invention, a graft polymer comprising a polyurethane graft backbone and grafted-on chains which comprise units of vinyl alcohol and units having lateral styrylpyridinium or styrylquinolinium groups.

In accordance with another aspect of the present invention there is provided a photocurable mixture comprising a polymer as described above and a photosensitive substance.

In accordance with a further aspect of the present invention there is provided a photocurable recording material comprising a layer support and a photosensitive recording layer comprising the above-described photocurable mixture.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF THE PREFERRED EMBODIMENTS

The graft polymers of the instant invention are novel. For preparing them, a carboxylic acid vinyl ester, and optionally another ethylenically unsaturated compound copolymerizable therewith, is grafted onto a polyurethane graft backbone and thereafter saponified completely or partially. The polymers having vinyl alcohol units obtained in this way, which are known from DE-A 37 32 089, are further reacted with activated compounds possessing styrylpyridinium or styrylquinolinium groups, to give the compounds according to this invention. Prior to or following the introduction of the photo-crosslinkable groups, the polymer can be acetalized with saturated aliphatic or aromatic aldehydes without photocrosslinkable groups.

The graft backbones consist of polyurethanes having at least two urethane groups in the molecule, the number of urethane groups per molecule being subject to no particular upper limit and in general having values higher than 2.

The polyurethanes employed as graft backbone can be produced from diols and diisocyanates by conventional processes of polyurethane synthesis. Cycloaliphatic diols, such as cyclohexanediols, and in particular aliphatic diols having 2 to 12 carbon atoms are preferred. Polyetherdiols, for example polyproylene oxides, polybutylene oxides and copolymers of ethylene oxide, propylene oxide and butylene oxide, preferably the block copolymers thereof, or poly-1,4-butanediols are also preferred; polyethylene oxides, especially those with molecular weights of between about 200 and 10,000, and more particularly of between about 400 and 1,500, are preferred. The polyetherdiols are advantageously employed in combination with low-molecular aliphatic diols, for example 1,4-butanediol, 1,3-propanediol, ethylene glycol, diethylene glycol, 1,2-hexanediol, 1,2-propanediol, pentanediol or cyclohexanediol. The molar ratio of polyetherdiol to low-molecular aliphatic diol is preferably from about 1 : 0.1 to 1 : 0.7.

Diisocyanate components which can be employed are aromatic diisocyanates. Aliphatic and/or cycloaliphatic diisocyanates are preferred. Preferred aliphatic diisocyanates are those having 2 to 12 carbon atoms in the aliphatic radical, for example ethylene diisocyanate, propylene diisocyanate, tetramethylene diisocyanate and 2,2,4-trimethylhexamethylene diisocyanate. Preferred cycloaliphatic diisocyanates are, for example, 1,4-diisocyanato-cyclohexane, dicyclohexylmethane-4,4'-diisocyanateandisophorone diisocyanate. Hexamethylene diisocyanate and isophorone diisocyanate are particularly preferred.

The molar ratio of diol component to diisocyanate component is preferably between about 1 : 0.99 and 1 : 0.5, in particular between about 1 : 0.98 and 1 : 0.7. The average molecular weights of the polyurethanes are preferably between about 200 and 100,000, in particular between about 1,000 and 50,000 and particularly preferentially between about 3,000 and 25,000.

Carboxylic acid vinyl esters having 3 to 20 and preferably 4 to 14 carbon atoms are employed for grafting onto the polyurethane. Vinyl acetate and/or vinyl propionate, in particular vinyl acetate, are particularly preferred. Mixtures of vinyl acetate and/or vinyl propionate and vinyl versatate are also preferred. In particular in the case of partial or complete saponification of the products following the graft polymerization, the couse of vinyl propionate in addition to vinyl acetate during grafting is advantageous. Moreover, copolymerizable mixtures of carboxylic acid vinyl esters can be grafted, preferably mixtures of vinyl acetate and minor amounts of vinyl versatate.

Grafting with different carboxylic acid vinyl esters in the form of block copolymers can also be advantageous. Furthermore, the carboxylic acid vinyl esters can also be grafted together with other ethylenically unsaturated and copolymerizable monomers, in particular acids, such as maleic acid, itaconic acid, mesaconic acid, crotonic acid, acrylic acid or the esters thereof.

The proportion of the grafted-on components is in general about 10 to 95, preferably about 30 to 90 and in particular about 40 to 80% by weight, based on the total graft polymer.

The graft polymers obtained can be saponified by hydrolysis, alcoholysis or transesterification, the degree of hydrolysis being at least about 30 mole %, preferably about 45 to 99 mole %, based on the mole number of saponifiable monomer units in the graft polymer. The production of the graft polymers with a polyurethane graft backbone and their saponification are described in DE-A 37 32 089.

The photocrosslinkable lateral groups can be introduced by reacting the free OH groups of the graft polymer in any desired known manner. It has been found that those polymers are particularly well suited for the purposes of the instant invention where the lateral groups have been introduced by acetalization.

The polymers according to this invention preferably comprise structural units of the general formula I

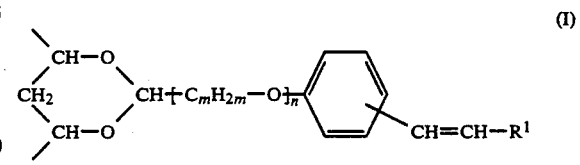

in which
$R^1$ denotes one of the groups

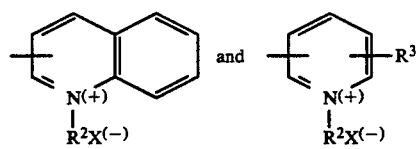

m denotes an integer from 1 to 6,
n denotes 0 or 1,
$R^2$ denotes hydrogen or an alkyl, alkenyl or aralkyl group,
$R^3$ denotes hydrogen or an alkyl group and
X denotes the anion of the nitrogen base.

In the $R^1$ groups the styryl radical preferably is in the 2-or 4-position, in particular in the 4-position, relative to the nitrogen atom of the heterocycle.

The term "alkyl group" here denotes a monovalent, straightchain or branched aliphatic hydrocarbon radical having 1 to 6 carbon atoms. The term "substituted alkyl group" denotes an alkyl group of the type defined above, that bears a substituent, such as a hydroxyl group, a carbamoyl group, an alkoxy group, or the like. The term "alkenyl group" denotes a straight-chain or branched aliphatic hydrocarbon radical having a double bond and 2 to 6 carbon atoms, preferably 2 to 4 carbon atoms. The term "aralkyl group" denotes an alkyl group substituted with an aromatic ring and in particular comprises the benzyl group.

The photocrosslinkable groups of the formula I are incorporated into the polymers by acetalizing the graft polyvinyl alcohols with aldehydes, on which the formula I units are based, or with the dimethyl acetals or diethyl acetals thereof.

The photocrosslinkable groups are advantageously introduced in water or N-methylpyrrolidone as the reaction medium, with the use of an acid as catalyst.

Any inorganic or organic acid can be used as catalyst for this reaction. Specific examples of suitable acids include hydrochloric acid, sulfuric acid, phosphoric acid, perchloric acid, tetrafluoroboric acid, methanesulfonic acid and p-toluenesulfonic acid. Since the reaction time decreases when the amount of acid catalyst is increased, it is expedient to set the added amount of acid as high as possible. In practice, about 0.01 to 5 equivalents of acid are usually employed per mole of aldehyde. The reaction is run at temperatures from about room temperature up to 100° C. The reaction time varies between about 1 and 24 hours.

Below is an exemplary list of aldehydes which are suited for preparing the polymers according to the invention:
1-methyl-2-(p-formylstyryl)pyridinium salt,
1-methyl-4-(p-formylstyryl)pyridinium salt,
1-ethyl-4-(p-formylstyryl)pyridinium salt,
1-propyl-4-(p-formylstyryl)pyridinium salt,
1-isopropyl-4-(p-formylstyryl)pyridinium salt,
1-butyl-4-(p-formylstyryl)pyridinium salt,
1-hexyl-4-(p-formylstyryl)pyridinium salt,
1-methyl-2-(p-formylstyryl)-5-methyl-pyridinium salt,
1-methyl-4-(p-formylstyryl)-5-ethyl-pyridinium salt,
1-ethyl-4-(p-formylstyryl)-4-methyl-pyridinium salt,
1-(2-hydroxyethyl)-4-(p-formylstyryl)pyridinium salt,
1-carbamoylmethyl-2-(p-formylstyryl)pyridinium salt,
1-allyl-4-(p-formylstyryl)pyridinium salt,
1-benzyl-4-(p-formylstyryl)pyridinium salt,
1-benzyl-2-(p-formylstyryl)-5-methyl-pyridinium salt,
1-benzyl-4-(p-formylstyryl-3-ethyl-pyridinium salt,
1-methyl-2-(p-formylstyryl)quinolinium salt and
1-ethyl-4-(p-formylstyryl)quinolinium salt, Suitable acetals are derived from the above formyl compounds, for example,
1-methyl-2-[p-(2,2-dimethoxyethoxy)styryl]pyridinium salt,
1-methyl-2-[o-(2,2-dimethoxyethoxy)styryl]pyridinium salt,
1-methyl-2-[m-(2,2-dimethoxyethoxy)styryl]pyridinium salt,
1-methyl-4-[p-(2,2-dimethoxyethoxy)styryl]pyridinium salt,
1-propyl-4-[p-(2,2-dimethoxyethoxy)styryl]pyridinium salt,
1-benzyl-4-[p-(2,2-dimethoxyethoxy)styryl]pyridinium salt,
1-methyl-4-[p-(4,4-dimethoxybutoxy)styryl]pyridinium salt,
1-methyl-4-[p-(2,2-ethylenedioxy)styryl]pyridinium salt and
1-methyl-4-[p-(2,2-dimethoxyethoxy)styryl]-3-ethylpyridinium salt.

The quaternary salts may be halides, such as chlorides, bromides and iodides; sulfates; methosulfates; p-toluenesulfonates; methanesulfonates; perchlorates; or the like The unsaturated aldehydes are prepared by condensing the corresponding picolines or N-alkylpicolinium salts or the alkyl quinolines or N-alkylalkylquinolinium salts with aromatic dialdehydes, for example, formylbenzaldehyde, and are used in the form of formylstyrylpyridinium or -quinolinium salts. The dialkyl acetals are prepared by condensing the corresponding N-alkylpicolinium salts or N-alkyl-alkylquinolinium salts with the formylphenoxyacetal.

The photocrosslinkable groups can be introduced immediately after the saponification of the carboxylic ester groups or after an acetalization with ordinary saturated aldehydes.

Aliphatic aldehydes having 1 to 20 carbon atoms, which may be substituted, and aromatic aldehydes, which may also be substituted, are employed for this acetalizing reaction. Preference is given to aliphatic aldehydes having 1 to 5 carbon atoms, such as n-butyraldehyde, isobutyraldehyde, propionaldehyde or formaldehyde. Substituted or unsubstituted benzaldehydes, such as benzaldehyde, p-chlorobenzaldehyde or p-methoxy-benzaldehyde are also suited. It is also possible to employ combinations of several of these aldehydes.

The hydroxyl number of the finished crosslinkable polymer should be in the range of about 100 to 600, preferably of about 200 to 500.

The acetalization can be performed employing two different methods:

In accordance with the first process variant, the graft polymer is dissolved or dispersed in an alcohol or in a water/alcohol mixture, mixed with a catalytic amount of an organic or inorganic acid and an aldehyde or aldehyde mixture, and heated. The polymer can be precipitated and purified by dropwise adding the reaction mixture to a nonsolvent.

In accordance with the second process variant, the graft polymer is dissolved in water and mixed with an aldehyde or aldehyde mixture. Subsequently, an aqueous solution of an inorganic or strong organic acid is added dropwise at a low temperature. Thereby, the acetalized graft polymer is precipitated in general. The reaction is completed at an elevated temperature of about 20° to 60° C. The isolated polymer is purified by washing with water or re-precipitation.

The conversion of the graft polyvinyl alcohols into graft polyvinyl acetals has been described in detail in the prior German Patent Applications P 38 35 840.9, corresponding to U.S. patent application Ser. No. 424,064, and P 39 20 229.1, corresponding to U.S. patent application Ser. No. 07/541,795, the contents of which are incorporated in their entireties by reference.

Other saturated lateral chains can be additionally introduced into the polymer. Appropriate radicals can be introduced by etherification or transesterification. Polymers with lateral chains containing free carboxyl radicals can, for example, be prepared by acylating the vinyl alcohol units with activated derivatives of di- or polybasic carboxylic acids, such as succinic acid anhydride or phthalic acid anhydride, with formation of the partial esters of these polybasic acids. Groups imparting solubility in alkaline media can also be incorporated by reacting OH groups of the polymer with sulfonyl isocyanates, employing known methods.

It is also possible to incorporate radicals with olefinically unsaturated double bonds, such as acrylate or methacrylate groups, by esterification, etherification or urethane formation.

Etherifications can be performed with hydroxyalkyl(meth) acrylates, N-alkylol (meth)acrylates or (meth)acrylates possessing oxirane rings. For the urethane formation, isocyanatoalkyl (meth)acrylates are preferably employed, and esterifications are predominantly performed with unsaturated carboxylic acid anhydrides or halides, such as (meth)acrylic acid anhydride or (meth)acrylic acid chloride.

The introduction of the photocrosslinkable groups into the graft polymer is preferably performed simultaneously with the introduction of the saturated acetal groups. For this purpose, the graft polyvinyl alcohol is preferably dissolved in water (N-methylpyrrolidone is used as the solvent if a water-insoluble graft polymer is used), and an antioxidant and a wetting agent are added if appropriate. The styrylpyridinium or -quinolinium salt and the acid catalyst are added to the solution, and the mixture is stirred at room temperature for one hour and at 40° C. for two hours. When the mixture has cooled down to room temperature again, the $C_1$ to $C_{20}$ aldehyde is added. Another amount of acid catalyst is then added dropwise in the form of an aqueous solution. The reaction is completed at an elevated temperature.

The progress of the reaction of the graft polyvinyl alcohol with the photosensitive salt can be surveyed by precipitating the polymer in a non-solvent and determining the absorption due to the photosensitive group.

The polymer solutions obtained as a result of the above synthesis can be directly incorporated into the mixtures according to this invention. To stabilize the acetal bond it is expedient to neutralize the solution with the aid of a base (for example, ammonia). The polymer can also be precipitated and purified by adding the solution dropwise to a non-solvent.

In general, the polymers according to this invention contain about 0.5 to 50, preferably about 1 to 20, mole % of units with groups of the formula I; about 0 to 85, preferably about 0 to 70, mole % of vinyl acetal units; about 0 to 45, preferably about 1 to 25, mole % of vinyl ester units of saturated aliphatic or aromatic carboxylic acids, and about 5 to 90, preferably about 10 to 70, mole % of vinyl alcohol units. The mole percentages relate to the content of the polymer of grafted-on units.

In general, the photosensitive mixtures contain about 20 to 90, preferably about 25 to 80, by weight, of the polymers according to the invention, relative to the weight of the non-volatile constituents of the mixture. Furthermore, they may contain 0 to about 80% by weight, preferably 0 to about 50% by weight, of customary saturated binders. Examples of suitable compounds are: polyamides, polyvinyl esters, polyvinyl acetals, polyvinyl ethers, epoxide resins, polyacrylic acid esters, polymethacrylic acid esters, polyesters, alkyd resins, polyacryl amides, polyvinyl alcohols, polyethylene oxides, polydimethylacrylamide, polyvinylpyrrolidone, polyvinylmethylformamide, polyvinylmethylacetamide, and copolymers of the monomers forming the homopolymers enumerated.

Advantageously, these binders, too, are water-insoluble but soluble or at least swellable in aqueous-alkaline solutions. Examples of polymers of this generic type include: maleate resins, polymers of β-(methacryloyloxy)ethyl N-(p-tolyl-sulfonyl)-carbamate and copolymers of these and similar monomers with other monomers, as well as vinyl acetate/crotonic acid copolymers, styrene/maleic anhydride copolymers, alkyl methacrylate/methacrylic acid copolymers and copolymers of methacrylic acid, higher alkyl methacrylates and methyl methacrylate and/or styrene, acrylonitrile and others.

Even without the addition of further photosensitive substances, photosensitive recording materials can be produced from the polymers according to this invention.

However, the photosensitivity of systems of this kind is relatively low.

The simplest way of obtaining a recording material fulfilling the requirements imposed by practical use is to add a sensitizer to the polymer.

Advantageous sensitizers for the polymers according to this invention include anthrones, such as the anthrones known from U.S. Pat. No. 2,670,285; benzanthrones; sensitizers of the nitro type, such as the sensitizers known from U.S. Pat. No. 2,610,120; triphenylmethanes, such as are known from U.S. Pat. No. 2,690,966; quinones, such as are described in U.S. Pat. No. 2,670,286; naphthones; pyrylium salts and thiapyrylium salts, such as are described, for example, in U.S. Pat. No. 3,257,664; furanones; anthraquinones; thiazoles and selenazoles, such as are known from U.S. Pat. No. 2,732,301; thiazolines; benzothiazoline; naphthothiazoline; cyanine dyes derived from thiazoles, benzothiazoles, benzoselenazoles, naphthothiazoles and benzoxazoles, such as are described in U.S. Pat. No. 2,732,301 or in FR-A 10 89 290; and acridones, such as are described in U.S. Pat. No. 3,072,485.

It is also possible to employ radiation-sensitive sensitizers, i.e., sensitizers which are modified by radiation, such as ketones or azides. Benz(a)anthracen-7,12-dione and 4,4'-bis(dimethylamino)benzophenone are typical representatives of this type of arylketone sensitizers. Further advantageous sensitizers of the ketone type include 4,4'-bis(diethylamino)-benzophenone, dibenzalacetone and 4,4'-bis(dimethylamino)benzophenonimide and compounds of the type described in U.S. Pat. No. 2,670,287. Coumarines represent another class of advantageous sensitizers, especially coumarines substituted in the 3-position, such as are described in DE-A 27 04 368.

The sensitizers are added in customary amounts. Concentrations of about 0.01 to 20% by weight, relative to the weight of the photo-crosslinkable polymer, have found to be advantageous.

Highly photosensitive polymerizable mixtures are obtained by combining the optionally sensitized photocrosslinkable polymers with photopolymerization initiators and free-radically polymerizable compounds.

A large number of substances can be used as photoinitiators. Examples include benzoins; benzoin ethers; polynuclear quinones, such as 2-ethyl-anthraquinone; acridine derivatives, such as 9-phenylacridine or benzacridines; phenazine derivatives, such as 9,10-dimethylbenz(a)phenazine; quinoxaline derivatives or quinoline derivatives, such as 2,3-bis-(4-methoxyphenyl)quinoxaline or 2-styrylquinoline; quinazoline compounds; or acylphosphineoxide compounds. Photoinitiators of this type are described in DE-C- 20 27 467, DE-C- 20 39 861, DE-A- 37 28 168, EP-B- 0,011,786 and EP-A 0,220,589. Hydrazones, mercapto compounds, pyrylium salts or thiopyrylium salts, xanthones, thioxanthones, benzoquinones, acetophenones, benzophenones, synergistic mixtures with ketones or hydroxy ketones and dyestuff redoxy systems may also be used. Particular preference is given to photoinitiators possessing photocleavable trihalomethyl groups, especially to corresponding compounds of the triazine or thiazoline series.

Compounds of this type are described in DE-A 27 18 259, DE-A 33 33 450 and DE-A 33 37 024. 2-(4-Methoxystyryl)-4,6-bis-trichloromethyl-s-triazine is a preferred example. It is advantageous to combine these compounds with photooxidizable dyes, photo-reducible compounds and optionally further co-initiators, as is described, for example, in EP-A 0,284,939 and EP-A 0,287,817.

The photoinitiators are generally employed in a quantity from about 0.01 to 15, and preferably from about 0.1 to 10, % by weight, relative to the non-volatile constituents of the mixture.

In addition, the mixtures and materials according to the invention preferably contain a free-radically polymerizable, preferably low molecular weight, compound with at least one terminal ethylenic double bond. Preferably, esters of acrylic or methacrylic acid with mono- or polyhydric, preferably primary, alcohols are used as the polymerizable compounds. Preferably, the polymerizable compounds should possess more than one, in particular 2 to 4, polymerizable groups. Examples of suitable polyhydric alcohols are ethylene glycol, propylene glycol, butane-1,4-diol, butane-1,3-diol, diethylene glycol, triethylene glycol or polyethylene glycols or polypropylene glycols with molecular weights from about 200 to 1,000, neopentyl glycol, glycerol, trimethylol-ethane, trimethylolpropane, pentaerythritol, bisphenol-A derivatives and reaction products of these compounds with ethylene oxide and/or propylene oxide. Bis-acrylates and bis-methacrylates which contain urethane groups and which are obtained by the reaction of 1 mole of a diisocyanate with 2 moles of a hydroxyalkyl acrylate or hydroxyalkyl methacrylate are particularly suited. The diisocyanate may also be an oligomeric product obtained by the reaction of a diol with a molar excess of a monomeric diisocyanate. These and similar monomers containing urethane groups are described in DE-A 20 64 079, DE-A 28 22 190, DE-A 30 48 502 and DE-A 35 40 480. In addition to the esters mentioned above, amides of acrylic or methacrylic acid can be employed. Examples are methylene-bis(meth)acrylamide, ethylene-bis-(meth)acrylamide and m-xylylene-bis-(meth)acrylamide.

The amount of monomers contained in the mixture generally is about 5 to 80% by weight, preferably about 20 to 60% by weight, of the non-volatile constituents.

Photocurable diazo compounds or azido compounds can also be contained in the mixtures as photosensitive compounds. Preference is given to diazonium salt polycondensation products which are obtained by condensation of aromatic diazonium salts with active carbonyl compounds, in particular formaldehyde.

It is particularly advantageous to use cocondensation products containing, in addition to the diazonium salt units A-N$_2$X, other, non-photosensitive units B which are derived from condensible compounds, particularly from aromatic amines, phenols, phenol ethers, aromatic thioethers, aromatic hydrocarbons, aromatic heterocyclic compounds and organic acid amines. These condensation products are described in DE-A 20 24 244. Generally, all diazonium salt polycondensation products described in DE-A27 39 774 are suitable.

The diazonium salt units A-N$_2$X are preferably derived from compounds corresponding to the formula

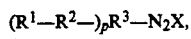

in which

X is the anion of the diazonium compound,
p is an integer from 1 to 3,
R$^1$ is an aromatic radical which is capable, in at least one position, of condensation with an active carbonyl compound,
R$^3$ is an arylene group, preferably a phenylene group which may be substituted,
R$^2$ is a single bond or one of the groups:

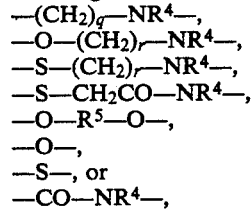

where
q is a number from 0 to 5,
r is a number from 2 to 5,
R$^4$ is a hydrogen atom, an alkyl group having from 1 to 5 carbon atoms, an aralkyl group having from 7 to 12 carbon atoms or an aryl group having from 6 to 12 carbon atoms, and
R$^5$ is an arylene group having from 6 to 12 carbon atoms.

Further advantageous polycondensation products are obtained by condensing an optionally substituted diphenylamine diazonium salt first with an aromatic compound R'—O—CH$_2$—B and then with an aromatic compound R'—O—CH$_2$—B—CH$_2$—O—R', R' denoting a hydrogen atom, an alkyl radical or an aliphatic acyl radical, and B denoting the radical of any one of the condensible compounds listed above. These condensation products are described in detail in EP-A 0,126,875.

The diazonium salt polycondensation products are contained in the mixture in an amount of 0 to about 60% by weight, preferably of about 10 to 40% by weight, relative to the non-volatile constituents of the mixture.

The exclusive addition of diazonium salt polycondensation products to the polymers according to this invention does not result in preferred mixtures. It is, however, advantageous to employ mixtures which additionally contain photoinitiators and low molecular-weight polymerizable compounds of the types described above.

Depending on their intended use and desired properties, the photosensitive mixtures can comprise further substances as admixtures. Examples thereof include: inhibitors which prevent thermal polymerization of the monomers, hydrogen donors, dyes, colored and uncolored pigments, color formers, indicators, plasticizers, chain transfer agents, levelling agents, matting agents, slip agents, and acids to stabilize the diazonium salt polycondensates, preferably phosphoric acid. Examples of suitable dyes and/or pigments include triphenylmethane dyes, e.g. Brilliant Green Dye (C.I. 42,040), Victoria Pure Blue FGA, Victoria Pure Blue BO (C.I. 42,595), Malachite Green, Crystal Violet, Victoria Blue B (C.I. 44,045), Rhodamine 6 (C.I. 45,160), naphthalimide dyes, azosoles and 3'-phenyl-7-dimethylamino-2,2'-spiro-di(2H-1-benzopyran). Photochromic systems whose color changes reversibly or irreversibly upon exposure to actinic light, without the photopolymerization process being thereby affected, include, for example, leuco dyes together with suitable activators. The leuco bases of the triphenylmethane dyes, such as Crystal Violet, Malachite Green, Leuco Basic Blue, Leuco Pararosaniline, and Leuco Patent Blue A and V are examples of leuco dyes; Rhodamine B Base is also suited. Activators for these photochromic compounds include, inter alia, organic halogen compounds, which upon irradiation with actinic light split off halogen radicals, or hexaarylbisimidazoles. 9-Nitroanthracene, 10,10'-bis-anthrone, phenazinium dyes, phenoxazinium dyes, acridinium dyes or phenothiazinium dyes, in particular in combination with mild reducing agents, are examples of compounds which can be added as sensitometric regulators.

The additives and/or auxiliaries are present in the photosensitive mixtures in the customary effective amounts known for the respective substances. As a rule, their amount should not exceed about 30% by weight, preferably about 20% by weight, of the photopolymerizable recording layer.

The support material is coated from appropriate organic solvents or solvent mixtures, generally by flow-coating, spraying or dipping. The coating method depends on the desired layer thickness, the dried layers usually having thicknesses between about 0.5 to 200 μm.

Suitable supports are, for example, magnesium, zinc, copper, aluminum, steel, and also polyester film or cellulose acetate film, Perlon gauze etc., the surfaces of which may have been subjected to a pretreatment. The support material may function as the final support or as a temporary support material from which the photosensitive layer is transferred by lamination to the workpiece to be processed.

Employing the mixture according to the invention, it is usually not necessary to exclude the access of oxygen during exposure. Nevertheless, it is generally favorable to keep the mixtures, which contain free-radically polymerizable monomers, substantially away from the influence of atmospheric oxygen during the photopolymerization. When the mixture is used in the form of thin copying layers, it is advisable to apply a suitable protective film which is substantially impermeable to oxygen. This film can be self-supporting and can then be peeled off before development of the copying layer. For this purpose, polyester films, for example, are suitable. The protective film can also comprise a material which dissolves in the developer liquid or can be removed during development, at least from the non-hardened areas. Materials which are suitable for this purpose are, for example, polyvinyl alcohol, vinyl alcohol/vinyl acetate copolymers, polyvinylpyrrolidone, vinylpyrrolidone/-vinylacetate copolymers, polyacrylic acid, butadiene/-maleic acid copolymers, polyvinylmethyl ethers, polyphosphates, sugars etc. Such protective layers generally have a thickness of about 0.1 to 10 μm, preferably of about 0.5 to 5 μm.

The recording material which is prepared using the photopolymerizable mixtures of the invention serves, on the one hand, to produce images on suitable supports or receptor sheets and, on the other hand, to produce reliefs which are used as printing plates, screens, resists, and the like.

In addition, it is also possible to use the photosensitive mixtures for the formulation of UV-hardenable printing inks or for the preparation of lacquers which are hardenable by ultraviolet radiation and may be used for the protection of surfaces.

Preferably, the mixtures are used for the production of lithographic printing plates, where aluminum is the preferred support material. It is particularly preferred to pretreat the aluminum used for this purpose in the usual manner, for example, by a mechanical, chemical or electrochemical graining process which is, optionally, followed by an anodic oxidation. A further treatment of this support material, for example, with polyvinyl phosphonic acid, alkali metal silicate, phosphate, hexafluorozirconate, chromate, borate, polyacrylamide and cellulose derivatives is advantageous.

The recording materials obtained from the mixtures are processed in the conventional manner, by exposing them imagewise and washing-out the unexposed areas of the layers with a suitable developer.

The recording material is exposed under an original, as is known in the art, using light sources which emit light with the highest possible spectral fraction in the near ultraviolet region. The material can also be exposed by laser irradiation. Suitable lasers for irradiation are shorter-wave lasers of adequate performance, for example, Ar lasers, krypton ion lasers, helium/cadmium lasers, emitting in the region between about 300 and 600 nm and, for some layers, even $CO_2$ lasers, which emit at about 10.6 μm, or YAG lasers emitting at about 1.06 μm.

As the developer solutions, neutral or preferably alkaline aqueous solutions are used, which have a pH value in the range from about 8 to 14, preferably from about 8.5 to 13, and which contain buffer salts, for example, water-soluble alkali metal phosphates, alkali metal silicates, alkali metal borates, alkali metal carbonates, alkali metal acetates or alkali metal benzoates. Additional constituents used are wetting agents, preferably anionic wetting agents and, if appropriate, water-soluble polymers. The solution can also contain minor amounts, for example, up to about 5 percent by weight, preferably not more than 2 percent by weight, of water-miscible organic solvents. It is preferred to use low-volatility solvents, for example, araliphatic alcohols, the vapor pressure of which is of no consequence in the handling of the developer. Development can be performed in the conventional manner by dipping, spraying, brushing or wiping-over with a pad. If desired, the developed material can be treated with a gumming solution.

The print runs can be increased by post-heating the exposed plates or by post-exposing the developed plates. The two process steps can also be combined. But even without an additional heat-treatment or post-exposure, high print runs are achieved.

A thermal post-treatment is also a suitable means for additionally strengthening photosensitive layers containing diazonium salt polycondensation products. Such a treatment is particularly recommended for planographic printing forms. It comprises heating the gummed printing form to a temperature of between about 180° C. and 240° C. The duration of the treatment depends on the temperature and generally is about two to twenty minutes. With this thermal post-treatment no crosslinking agent is required. It is assumed that the polymers having photocrosslinkable side groups undergo an additional thermal crosslinking reaction. It may, however, be expedient to add a thermal crosslinking agent to the photosensitive mixture, such as, for example, an organic peroxide, which has a scorch temperature of at least 100° C. and above this temperature is capable of forming free radicals, as is described in EP-A 0,247,461. Examples of suitable peroxides include peroxy-esters, peroxyketals, bisaralkyl peroxides, dialkyl peroxides and bis-dialkyl peroxides. The ink acceptance of the photosensitive layers is substantially improved by this thermal post-treatment, in particular, if the polymers employed have high hydroxyl numbers.

The mixtures according to the invention and the recording materials obtained therefrom are sufficiently hydrophobic to guarantee good ink acceptance. In the exposed areas, virtually no swelling is observed during development. Compared to known photocrosslinkable polymers based on polyvinyl alcohol, the polymers of this invention are distinguished by a reduced brittleness. This property is particularly pronounced in the case of those compounds whose polyurethane graft backbone contains ether groups, i.e., has been obtained with the co-use of polyether diols. This furthermore improves the solubility in aqueous developer solutions. The elasticity of the graft polymers according to the instant invention is additionally increased by the urethane groups contained in the graft backbone.

Due to the photocrosslinkable groups in the polymer, the photosensitive layer is intensely hardened upon exposure; the increased strength of the exposed polymer layer in turn results in a longer print run.

The brittleness observed when the known photocrosslinkable polymers based on polyvinyl alcohol are employed is avoided, on the one hand, by a higher degree of modification of the polyvinyl alcohol graft polymers of the invention and, on the other hand, by the above-mentioned structural particularities of these graft polymers. Compared to customary polyvinyl alcohols, the melting temperatures of the polyvinyl alcohol derivatives grafted onto polyurethanes are substantially lower, and this considerably reduces the brittleness of the polymers as well. The melting points of the polymers can be varied within very wide ranges by appropriately adjusting the composition of the polyurethane graft backbone and the degree of saponification and the substitution of the OH groups formed.

The photosensitive recording materials according to this invention give printing plates which are distinguished by excellent reproduction properties and can be easily processed with non-polluting developer solutions without scum. The intermolecular crosslinking of the polymer upon exposure causes an extreme molecular weight increase. This imparts additional hardness to the layer, which has a favorable effect on long print runs. The photospeed of the mixtures according to the invention is considerably increased, too. Printing plates without oxygen barrier layers are, in particular, distinguished by shorter exposure times than are required for comparable known printing plates.

The invention and its possible fields of application are illustrated in greater detail by the Examples below. Parts by weight (pbw) and parts by volume (pbv) bear the same relationship as g and cm³; unless otherwise specified, percentages and amounts are related to weight.

First, the preparation of the graft polymers used in the Examples is described.

a) Preparation of polyurethane graft backbones

In each case, the diol component and the catalyst were first introduced into a reaction vessel equipped with a stirrer and supplied with a nitrogen atmosphere, and the mixture was heated to a reaction temperature of between 65° C. and 100° C. Then the diisocyanate component was metered in whereby care was taken that the temperature of the reaction mixture did not exceed 120° C., and preferably did not exceed 100° C. After the complete addition of the diisocyanate component, the mixture was post-heated to a temperature between 80° C. and 100° C. for a period of up to two hours in order to complete the reaction. The completion of the conversion and thus the end of the reaction were determined by an analysis of the diisocyanate consumption with the aid of known methods (p.e., IR-spectroscopy, titration).

The detailed composition of the reaction mixtures used in the Examples and the calculated weight average molecular weights ($\overline{M}_{calc}$) of the resulting polyurethanes(PU) are compiled in Table 1 below. The molecular weights result from the molar ratio diol component/diisocyanate, assuming a complete conversion of the NCO groups.

TABLE 1

| Polyurethane (PU) | Diol component PEG/Bu (molar ratio) | Reaction temp. (°C.) | Molar ratio diol component/ diisocyanate | $\overline{M}_{calc}$ |
|---|---|---|---|---|
| A | 7:3 | 80 | 1:0.9 | 6,470 |
| B | 7:3 | 72 | 1:0.9 | 6,470 |
| C | 3:2 | 78 | 1:0.97 | 18,300 |
| D | 7:3 | 75 | 1:0.97 | 19,900 |

PEG = Polyethylene glycol, molecular weight 600
Bu = 1,4-butanediol

All products were prepared using isophorone diisocyanate as the diisocyanate component. In each case, 1,4-dimethylpiperazine was used as the catalyst in an amount of 0.48 mole %, relative to the diisocyanate.

b) Preparation of the graft polymers

In each case, the polyurethane graft backbone was melted in a reaction vessel in a nitrogen atmosphere or was dissolved, respectively, by adding small amounts of methanol, and heated to a temperature between 60° C. and 100° C. The monomers to be grafted on, which had optionally been dissolved in a solvent (e.g. methanol), including the free-radical initiator dissolved in the monomer, were then slowly metered to the polyurethane graft backbone, in a way such that the homopolymer formation was largely suppressed.

The maximum temperature of the reaction mixture should be 120° C., more preferably 100° C. When the post-reaction was completed, excess monomer remainders were removed by azeotropic distillation with methanol. The compositions of the individual reaction mixtures and the reaction parameters are compiled in Table 2 below.

TABLE 2

| Graft polymer | PU | VAc g/g PU | Start temp. °C. | Metering time min | Post react. min | Grafted-on monom. wt % | $J_o$ ml/g | calc molecular weight |
|---|---|---|---|---|---|---|---|---|
| AV | A | 4 | 75 | 420 | 45 | 79.8 | 21.9 | 31,300 |
| BV | B | 2.32 | 73 | 420 | 45 | 69.3 | 18.3 | 21,000 |
| CV | C | 3.16 | 75 | 300 | 45 | 74.7 | 26.3 | 72,500 |

TABLE 2-continued

| Graft polymer | PU | VAc g/g PU | Start temp. °C. | Metering time min | Post react. min | Grafted-on monom. wt % | $J_o$ ml/g | calc molecular weight |
|---|---|---|---|---|---|---|---|---|
| DV | D | 3.16 | 75 | 420 | 45 | 74.5 | 28.7 | 78,000 |

VAc = Vinyl acetate
$J_o$ = intrinsic viscosity

All products were prepared employing 0.2 mole % of dibenzoyl peroxide (relative to the monomer used in each case). The intrinsic viscosities were determined at 25° C. in tetrahydrofuran, using an Ostwald Viscosimeter, with the measured concentrations being selected such that a Hagenbach correction was not necessary. The grafted-on amount of monomer, in % by weight, is related to the weight of the total polymer.

c) Saponification of the graft polymers

The graft polymers of Table 2 were transesterified or saponified within two hours at room temperature. For this purpose, the products were dissolved in methanol to give 50% strength solutions and mixed with methanolic soda lye (10% strength). Depending on the added amount of alkali and the degree of grafting of the graft polymer, polymeric hydrolysis products having different degrees of hydrolysis were obtained. The resulting gels were granulated, the granules were washed with methanol (where appropriate with an addition of acetic acid to neutralize the soda lye) and dried. The process parameters and results are compiled in Table 3 below.

TABLE 3

| Graft polyvinyl alcohol | Graft polyvinyl acetate | mole % of NaOH per ester unit | mole % of H$_2$O per ester unit | Degree of hydrolysis in % | $\overline{M}_{calc}$ |
|---|---|---|---|---|---|
| E | AV | 1.92 | 0 | 98.2 | 22,000 |
| F | BV | 5.00 | 0 | 98.9 | 14,000 |
| G | CV | 1.92 | 0 | 98.0 | 47,000 |
| H | DV | 1.97 | 0 | 98.4 | 44,000 |

Below, the preparation of unsaturated polymers according to this invention, containing styrylpyridinium or styrylquinolinium side groups, from the graft polyvinyl alcohols E to H is described in detail. The polymers and their general preparation data are compiled in Table 4.

TABLE 4

| Polymer of the invention | OH-polymer used | unsaturated aldehyde | further reactive compound | 1) mole % |
|---|---|---|---|---|
| I | H | N-methyl-4-(p-formylstyryl)-pyridinium methosulfate | — | 2.4 |
| K | G | " | — | 4.9 |
| L | G | " | — | 6.25 |
| M | E | " | — | 2.4 |
| N | F | " | — | 2.4 |
| O | F | " | — | 3.3 |
| P | F | " | — | 4.8 |
| Q | F | " | — | 5.3 |
| R | F | " | — | 8.0 |
| S | F | " | — | 11.1 |
| T | H | N-ethyl-4-(p-formylstyryl)-pyridinium-p-toluene sulfonate | — | 2.9 |
| U | H | N-benzyl-4-(p-formylstyryl)-pyridinium brominde | — | 2.7 |
| V | H | N-methyl-4-(p-formylstyryl)-pyridinium iodide | — | 3.1 |
| W | H | N-methyl-4-(p-formylstyryl)-pyridinium methosulfate | — | 2.9 |
| X | I | — | 2-hydroxyethyl methacrylate | 2.4\|13.3* |
| Y | I | — | N-methylol methacrylamide | 2.4\|9.3* |
| Z | G | N-methyl-4-(p-formylstyryl)-pyridinium methosulfate | 2-hydroxyethyl methacrylate | 2.5\|19.2* |
| AA | G | " | N-methylol methacrylamide | 2.5\|13.1* |
| BB | I | — | methacryloyl chloride | 2.9\|25.3* |
| CC | I | — | propenylsulfonyl isocyanate | 2.4 |
| DD | I | — | toluene sulfonyl isocyanate | 2.1 |
| EE | E | N-methyl-4-(p-formylstyryl)-pyridinium methosulfate | phthalic acid anhydride | 2.45 |
| FF | H | N-ethyl-4-(p-formylstyryl)-quinolinium-p-toluene sulfonate | — | 2.1 |
| GG | H | " | — | 4.3 |
| HH | G | N-ethyl-4-[p-(2,2-dimethoxyethoxy)-styryl] pyridinium-p-toluene-sulfonate | — | 1.2 |
| II | F | N-methyl-4-[p-(2,2-dimethoxyethoxy) styryl] quinolinium | — | 0.9 |

TABLE 4-continued

| Polymer of the invention | OH-polymer used | unsaturated aldehyde | further reactive compound | 1) mole % |
|---|---|---|---|---|
| | | | | iodide |

1) Styrylpyridinium- or styrylquinolinium groups
*(Meth)acryloyl groups, in mol-%

Polymer I 10 pbw of polymer H were dissolved in 100 pbv of distilled water with heating. The solution was mixed with 0.04 pbw of 2,6-di-tert.-butyl-4-methylphenol, 0.08 pbw of sodium octyl sulfate and 2.01 pbw of N-methyl-4-(p-formyl-styryl)-pyridinium methosulfate. Then 0.4 pbw of concentrated hydrochloric acid were added and the mixture was stirred at 40° C. for 2 hours. Subsequently the mixture was cooled down to room temperature, and 2.88 pbw of n-butyraldehyde were added; thereafter, 2.6 pbv of concentrated hydrochloric acid, in 20 pbv of distilled water, were added dropwise, and the mixture was stirred for another 2 hours at 40° C. The precipitated polymer was dissolved in ethanol, reprecipitated in water and dried in a vacuum drying cabinet at 40° C. It contained 2.4 mole % of styrylpyridinium groups.

Polymer K 10 pbw of polymer G were dissolved in 100 pbv of distilled water with heating and acetalized with 4.2 pbw of N-methyl-4-(p-formylstyryl)-pyridinium methosulfate and 2.88 pbw of n-butyraldehyde, as described for Polymer I. The reprecipitated and dried polymer contained 4.9 mole % of styrylpyridinium units.

Polymer L

In accordance with the preparation method of polymer I, a binder containing 6.25 mole % of styrylpyridinium groups was prepared from 10 pbw of polymer G, with 5.03 pbw of the pyridinium salt used for polymer I and 3.60 pbw of n-butyraldehyde.

Polymer M

In accordance with the preparation method of polymer I, a binder, which after reprecipitation and drying contained 2.4 mole % of styrylpyridinium groups, was prepared from 10 pbw of polymer E, with the pyridinium salt employed for preparing polymer I and n-butyraldehyde.

Polymers N to S

In each case, 10 pbw of polymer F were used to prepare the respective polymers employing varying amounts of pyridinium salt and 2.88 pbw of n-butyraldehyde. The respective contents of styryl-pyridinium groups are compiled in Table 4.

Polymers T to W

Binders were prepared using 10 pbw of polymer H and a different pyridinium salt in each case. Synthesis was performed as described for polymer I. The salt was in each case added in an equivalent amount, so that in each of the resulting binders about 3 mole % of the originally present hydroxyl groups were acetalized with the photocrosslinkable aldehyde. Thereafter, acetalization was performed with 2.88 pbw of n-butyraldehyde each, and the respective polymer was purified by reprecipitation. The individual contents of styrylpyridinium groups are indicated in Table 4.

Polymers X and Y

Two solutions were prepared, which each comprised 10 pbw of polymer I and 80 pbv of N-methylpyrrolidone. 3.9 pbw of 2-hydroxyethyl methacrylate (X) and 2.31 pbw of N-methylol methacrylamide (Y) were added, the pH of the mixtures was adjusted to 2.5 by means of phosphoric acid, 0.05 pbw of 2,6-di-tert.-butyl-4-methylphenol were added to each mixture, and the two mixtures were stirred for 20 hours at 60° C. After cooling down to room temperature, the polymers were reprecipitated from water. Each of them contained 2.4 mole % of styrylpyridinium groups, the content of methacryloyl groups was 13.3 mole % (X) and 9.3 mole % (Y).

Polymers Z and AA

Two solutions were prepared, which each comprised 10 pbw of polymer G and 80 pbw of distilled water. The two solutions were adjusted to a pH of 2.5 by means of phosphoric acid, then 0.05 pbw of 2,6-di-tert.-butyl-4-methylphenol and 5.2 pbw of 2-hydroxyethyl methacrylate (Z) and 3.5 pbw of N-methylol methacrylamide (AA), respectively, were added, and the mixtures were stirred at 60° C. for 20 hours. Thereafter, 0.08 pbw of sodium octyl sulfate and 2.01 pbw of N-methyl-4-(p-formylstyryl)-pyridinium methosulfate were added to each of the two solutions, and the mixtures were stirred for another 2 hours at 40° C. The resulting polymer solutions were acetalized as described for polymer I by adding 2.88 pbw of n-butyraldehyde to each solution. The reprecipitated polymers contained 2.5 mole % of styrylpyridinium groups and 19.2 mole % of methacryloyl groups (Z) and 13.1 mole % of methacryloyl groups (AA), respectively.

Polymer BB 10 pbw of a polymer prepared in the same way as polymer I were dissolved in 100 pbv N-methylpyrrolidone and mixed with 0.2 pbw of 2,6-di-tert.-butyl-4-methyl phenol and 0.05 pbw of dimethylaminopyridine. 4.1 pbw of methacryloyl chloride were added dropwise and 5.5 pbw of triethylamine were added with care. The solution was stirred for 8 hours at 50° C. After cooling down to room temperature, the polymer was reprecipitated from water. It contained 2.9 mole % of styrylpyridinium groups and 25.3 mole % of methacryloyl groups.

Polymer CC 10 pbw of polymer I were dissolved in 100 pbv of N-methylpyrrolidone and 2.07 pbw of propenylsulfonyl isocyanate were dropwise added. Two drops of dibutyl tin dilaurate were added, and the resulting solution was stirred for 1.5 hours at room temperature, for 3 hours at 60° C. and finally for 12 hours at room temperature. The polymer was reprecipitated from acetone. It contained 2.4 mole % of styrylpyridinium groups and had an acid number of 42.

Polymer DD 10 pbw of a polymer prepared in the same way as polymer I were dissolved in 100 pbv of N-methylpyrrolidone. 3.95 pbw of p-toluenesulfonyl isocyanate were added dropwise. After the addition of 2 drops of dibutyl tin dilaurate the solution was stirred for 1.5 hours at room temperature, for 3 hours at 60° C. and for 12 hours at room temperature. The polymer was reprecipitated from acetone. It contained 2.1 mole % of styrylpyridinium groups and had an acid number of 36.

Polymer EE 20 pbw of polymer E were dissolved in 160 pbw of distilled water. 5.8 pbw of n-butyraldehyde and 0.08 pbw of 2,6-di-tert.-butyl-4-methylphenol were added at room temperature. A solution comprising 0.16 pbw of sodium octyl sulfate, 2 pbw of concentrated hydrochloric acid and 24 pbw of water was dropwise added to the mixture with agitating. The reaction mixture was first stirred for 1 hour at room temperature, then heated to 40° C. and stirred for a further 2 hours. After the addition of 5.7 pbw of concentrated hydrochloric acid stirring was continued at 40° C. for 2 hours. The mixture was then allowed to cool down to room temperature, and the aqueous phase was decanted from the precipitated polymer. The polymer was dissolved in ethanol, reprecipitated from 10,000 pbw of distilled water and dried in a vacuum drying oven until its weight remained constant. 20 pbw of the polymer prepared in this way were dissolved in 150 pbw of N-methyl pyrrolidone and mixed with 5.9 pbw of phthalic acid anhydride and 0.5 pbw of triethylamine. The resulting solution was stirred at 80° C. for 6 hours. After the mixture had cooled down to room temperature, the polymer was precipitated from water and dried. It had an acid number of 39. 18.6 pbw of this polymer were reacted with 2.01 pbw of the styrylpyridinium salt employed for polymer I, in accordance with the above acetalization procedure. The precipitated polymer had a styrylpyridinium group content of 2.45 mole %.

Polymers FF and GG

Binders were prepared as described for polymer I except that 2.8 pbw (FF) and 5.6 pbw (GG) of N-ethyl-4-(p-formylstyryl)-quinolinium-p-toluene sulfonate were employed. The binders contained 2.1 mole % (FF) and 4.3 mole % (GG) of styrylquinolinium groups.

Polymer HH

A polymer was prepared as described for polymer I, except that 10 pbw of polymer G and 2.0 pbw of N-ethyl-4-[p-(2,2-dimethoxyethoxy)styryl]-pyridinium-p-toluene sulfonate were employed. After precipitation from water, the polymer contained 1.2 mole % of photocrosslinkable units.

Polymer II

A binder was prepared as described for polymer I, except that 10 pbw of polymer F were used as starting polymer and 1.2 pbw of 1-methyl-4[p-(2,2-dimethoxyethoxy)styryl]-quinolinium iodide were employed instead of the styrylpyridinium salt used for preparing polymer I. After precipitation from water, the binder contained 0.9 mole % of photocrosslinkable units.

EXAMPLE 1

Coating solutions comprised of
2.00 pbw of polymer I,
0.04 pbw of one of the sensitizers listed in Table 5 below and
40.00 pbw of propylene glycol monomethyl ether
were applied to 0.3 mm thick aluminum foils which had been electrochemically grained in nitric acid, anodically oxidized in sulfuric acid and post-treated with a 0.1% strength aqueous solution of polyvinyl phosphonic acid. Application was performed such that dry layer weights of 1.65 g/m$^2$ resulted. The photosensitive layers obtained in this way were exposed for 120 seconds through a 13-step exposure test wedge having density increments of 0.15 by means of a 5 kW metal halide lamp arranged at a distance of 110 cm. The layers were developed with a developer solution having the following composition, by rubbing with a cotton pad:
5.0 pbw sodium octyl sulfate,
1.5 pbw of sodium metasilicate×5 H$_2$O,
1.0 pbw of disodium hydrogen phosphate×12 H$_2$O and
92.5 pbw of distilled water.

The non-exposed layer areas were completely removed within 10 seconds. The plates were then rinsed with water. The steps indicated in Table 5 below, of the silver film continuous tone stepwedge were reproduced solid on the copies. Even the finest screen elements and lines of the original were rendered.

TABLE 5

| Test No. | Sensitizer | Wedge Step |
|---|---|---|
| 1 | alcohol-soluble Eosine (C.I. 45,386) | 8 |
| 2 | 3,3'-carbonyl-bis-(7-diethylamino)-coumarine | 7 |
| 3 | 2-benzoylmethylene-3-methyl-naphthothiazoline | 8 |
| 4 | Crystal Violet (C.I. 42,555) | 8 |
| 5* | Stains All dye (CAS 7423-31-6) | 7 |
| 6* | Stains All dye and 3,3'-carbonyl-bis-(7-diethylamino-coumarine), 1:1 | 9 |

*In these cases, a mixture comprised of 30 pbw of propylene glycol monomethyl ether and 10 pbw of a mixture comprising 60 pbv of butyrolactone, 30 pbv of methanol and 10 pbv of butyl acetate (85% strength) was used as the solvent.

EXAMPLE 2

Coating solutions were prepared from
1.700 pbw of polymer K
1.280 pbw of one of the monomers listed in Table 6 below,
0.068 pbw of 2,4-bis-trichloromethyl-6-(4-styrylphenyl)-s-triazine and
0.017 pbw of the dye employed in Example 1, Test 2, in
42.500 pbw of 2-methoxyethanol and applied onto the support material specified in Example 1, such that dry layer weights of 1.8 g/m$^2$ were obtained. The plates were exposed for 15 seconds through a standard negative continuous tone step wedge as in Example 1. Development was performed as in Example 1. The plates were then rinsed with water. The steps indicated in Table 6 were reproduced solid.

TABLE 6

| Test No. | Monomer | Wedge Step |
|---|---|---|
| 1 | Reaction product obtained from 1 mol of 2,2,4-trimethyl-hexamethylene diisocyanate and 2 mol of hydroxyethyl methacrylate | 4 |
| 2 | Trimethylolpropane-triacrylate | 5 |
| 3 | Trimethylolpropane trimethacrylate | 5 |

TABLE 6-continued

| Test No. | Monomer | Wedge Step |
|---|---|---|
| 4 | Pentaerythritol triacrylate | 7 |
| 5 | Technical-grade mixture of pentaerythritol tri- and tetraacrylate | 7 |

EXAMPLE 3

Coating solutions were prepared from
2.20 pbw of polymer L,
1.40 pbw of a technical-grade mixture of pentaerythritol tri- and tetraacrylate,
0.08 pbw of one of the photoinitiators listed in Table 7 below, and
0.04 pbw of 3,3'-carbonyl-bis-(7-diethylaminocoumarine), in
50.00 pbw of 2-methoxyethanol
and applied to aluminum plates which had been electrolytically grained in hydrochloric acid, anodically oxidized in sulfuric acid and post-treated with polyvinylphosphonic acid, such that dry layer weights of 2.0 g/m² were obtained. The plates were exposed for 20 seconds, and the non-exposed layer areas were then removed with a developer solution having the following composition:
5.0 pbw of sodium octyl sulfate,
1.5 pbw of sodium metasilicate×5 H₂O,
1.0 pbw of trisodium phosphate×12 H₂O, and
0.5 pbw of disodium hydrogen phosphate×12 H₂O, in
92.5 pbw of distilled water.

The steps of the continuous tone step wedge indicated in Table 7 below were reproduced solid.

TABLE 7

| Test No. | Photoinitiator | Wedge Step |
|---|---|---|
| 1 | 1,2-benzanthraquinone | 4 |
| 2 | 2-(4-trichloromethyl-benzoylmethylene)-3-ethyl-benzothiazoline | 9 |
| 3 | N-p-chlorobenzoyl-4,5-diphenyl-2-o-chlorophenyl-imidazole | 7 |
| 4 | 2-(p-trichloromethyl-benzoyl)-pyrazoanthrone | 6 |
| 5 | isopropylthioxanthone (Quantacure ITX) | 2 |
| 6 | 2,5-bis-(4-diethylamino-phenyl)-1,3,4-oxadiazole | 3 |
| 7 | 2,4-bis-trichloromethyl-6-(4-styryl-phenyl)-s-triazine | 9 |

EXAMPLE 4

A coating solution was prepared from
1.700 pbw of polymer M,
1.280 pbw of pentaerythritol triacrylate,
0.068 pbw of the triazine of Example 2, and
0.017 pbw of the coumarine dye of Example 1, Test 2, in
42.500 pbw of 2-methoxyethanol
and applied to the support material of Example 1. The dry layer weight was 1.8 g/m². Exposure was performed for 10 seconds at a distance of 110 cm by means of a 5 kW metal halide lamp, under the exposure test wedge described in Example 1. Following exposure, the plate was developed with the developer of Example 3. The non-exposed layer areas were removed within a short time after being wetted with the developer liquid. The developed plate was rinsed with water and dried. Step 4 was completely reproduced on the copy.

Even the finest screen dots and lines of the original were reproduced.

The printing plate prepared as described above was coated with a layer of polyvinyl alcohol (12% of residual acetyl groups, K-value 4), such that a dry layer weight of 0.8 g/m² resulted. It was surprising to state that the curing rate of the photosensitive layer was not significantly affected by the oxygen barrier layer applied. Under the same exposure and development conditions, a solid step 5 was obtained.

EXAMPLE 5

Printing plates prepared as in Example 4, with and without an oxygen barrier layer, were heated to 100° C. for one minute following exposure, and then developed.

In both cases only one additional solid step was obtained on the continuous tone step wedge.

EXAMPLE 6

Coating solutions were prepared as described in Example 2, except that for each test one of polymers N to S was used and pentaerythritol triacrylate was employed as monomer for all tests. The solutions were applied such that dry layer weights of 1.85 g/m² were obtained. As described in Example 1, the photosensitive layers were exposed through a standard negative test original for 15 seconds and developed with the following developer solution:
5.0 pbw of sodium octyl sulfate,
1.5 pbw of sodium metasilicate×5 H₂O and
1.5 pbw of trisodium phosphate×12 H₂O, in
92.0 pbw of distilled water.

Table 8 below shows the numbers of solid wedge steps obtained.

TABLE 8

| Polymer | Styrylpyridinium groups mole % | Wedge Steps |
|---|---|---|
| N | 2.4 | 5 |
| O | 3.3 | 6 |
| P | 4.8 | 7 |
| Q | 5.3 | 8 |
| R | 8.0 | 8 |
| S | 11.1 | 7 |

The photosensitivity cannot be arbitrarily enhanced by increasing the content of styryl-pyridinium groups, for the salt groups at the same time cause an increase of the solubility of the polymer, and thereby the layer is rendered more easily developable.

EXAMPLE 7

Polymers T to W were added to the following solution:
2.28 pbw of pentaerythritol triacrylate,
2.28 pbw of polymer
0.20 pbw of 2-(4-trichloromethylbenzoylmethylene)-3-ethylbenzothiazoline, and
0.15 pbw of 3-benzoylmethylene-3-methylnaphthothiazoline, in
90.00 pbw of 2-methoxyethanol.

As described in Example 4, the solutions were applied to the support material of Example 1 (layer weight 1.9 g/m²). Exposure (10 seconds) and development were also performed in accordance with Example 1. The results are compiled in Table 9 below.

TABLE 9

| Polymer | Styrylpyridinium groups mole % | Wedge Steps |
|---|---|---|
| T | 2.9 | 8 |
| U | 2.7 | 7 |
| V | 3.1 | 4 |
| W | 2.9 | 6 |

EXAMPLE 8

Polymers X and Y were employed in the following solution:
2.00 pbw of polymer
0.02 pbw of 3,3-carbonyl-bis-(7-diethylaminocoumarine) and
0.08 pbw of the benzothiazoline of Example 7, in
70.00 pbw of 2-methoxyethanol.

The solutions were spin-coated onto the support material specified in Example 1 (layer weight 1.85 g/m$^2$). Then the photosensitive layers were exposed for 15 seconds and developed with the developer of Example 6. The plate prepared with polymer X exhibited a solid step 5, the plate prepared with polymer Y exhibited a solid step 6 of the continuous tone step wedge. The printing plate prepared with polymer Y was additionally coated with an oxygen barrier layer as in Example 4. Exposure and development were preformed as above. The copy exhibited a solid step 8 of the continuous tone step wedge.

EXAMPLE 9

Polymers Z and AA were used in a coating solution as described in Example 8, and the solutions were coated onto the support material specified in Example 1, such that dry layer weights of 1.9 g/m$^2$ were obtained. The layers were exposed for 10 seconds and developed with the developer of Example 3. The continuous tone step wedge presented a solid step 5 in the case of polymer Z and a solid step 6 in the case of polymer AA.

EXAMPLE 10

The polymer contained in the coating solution of Example 8 was replaced by an identical amount of polymer BB, and the solution was employed to prepare a printing plate as described in Example 8. Exposure was performed for 8 seconds, and development was carried out with the developer of Example 6. The copy presented a solid step 6. When an oxygen barrier layer was applied to the printing plate, the same number of wedge steps was achieved after an exposure time of 3 seconds.

EXAMPLE 11

A coating solution was prepared from
2.50 pbw of polymer L,
0.86 pbw of a diazonium salt polycondensation product prepared from 1 mole of 3-methoxydiphenylamine-4-diazonium sulfate and 1 mole of 4,4'-bis-methoxy-methyldiphenylether, isolated as mesitylene sulfonate,
0.10 pbw of phosphoric acid (85% strength),
0.03 pbw of phenylazondiphenylamine, and
0.13 pbw of Victoria Pure Blue FGA (C.I. Basic Blue 81), in
40.00 pbw of 2-methoxyethanol
and applied to an aluminum foil which had been electrochemically grained, anodically oxidized and post-treated as in Example 1. Application took place such that a dry layer weight of 1.0 g/m$^2$ resulted.

The layer was exposed for 30 seconds through a negative original. Development was performed with the developer of Example 3.

Step 4 of the exposure test wedge was completely cured on the printing plate. Compared to known printing plates of the same type the plate of the invention is distinguished by easy developability.

EXAMPLE 12

A coating solution was prepared from
1.560 pbw of polymer I,
0.910 pbw of a diazonium salt polycondensation product prepared from 1 mole of 3-methoxy-diphenylamine-4-diazonium sulfate and 1 mole of 4,4'-bis-methoxymethyl-diphenylether, isolated as mesitylene sulfonate,
0.049 pbw of phosphoric acid (85% strength),
0.162 pbw of 2-(4-methoxystyryl)-4,6-bis-trichloromethyl-s-triazine,
1.750 pbw of a technical-grade mixture of pentaerythritol tri- and tetraacrylate
0.550 pbw of Victoria Pure Blue FGA, in
77.000 pbw of 2-methoxyethanol
and applied to an aluminum foil which had been electrochemically grained, anodically oxidized and post-treated with polyvinylphosphonic acid. Application took place such that a dry layer weight of 1.9 g/m$^2$ resulted.

The layer was exposed for 35 seconds through a negative original. Development was performed with the developer of Example 1.

Step 4 of the exposure test wedge was completely cured on the printing plate. Compared to printing plates prepared with conventional binders, the plate of the invention was distinguished by an improved developability.

EXAMPLE 13

Polymer CC was employed in the solution described in Example 4. The layer weight was 1.80 g/m$^2$. A solid step 6 was obtained on the continuous tone step wedge after an exposure time of 15 seconds and development with the solution of Example 3. The developability of the plate was considerably improved, so that no toning was observed even after the developer had been diluted with water in a 1:1 ratio.

EXAMPLE 14

Analogously to Example 13, polymer DD was used to prepare a printing plate. A solid step 6 was obtained on the continuous tone step wedge. In this case, too, the developability was considerably improved, i.e., the developer diluted with water (1:1) could likewise be used without scumming occurring.

EXAMPLE 15

Analogously to Example 13, polymer EE was employed to produce a printing plate. A solid step 4 was obtained on the step wedge. Developability was facilitated to such an extent that even portions of the cured layer were removed by the developer of Example 3. When the developer had been diluted with water (1:1), a solid step 6 was obtained.

EXAMPLE 16

Polymers FF and GG were tested in a solution according to Example 3. The solutions were applied to the support material of Example such that layer weights of 1.87 g/m² resulted. The exposure time was 10 seconds, development was performed with the developer of Example 6. Printing plates exhibiting a solid step 4 (FF) and a solid step 5 (GG) were obtained.

EXAMPLE 17

Analogously to Example 16, polymer HH was used to prepare a printing plate. A solid step 4 was obtained.

EXAMPLE 18

Analogously to Example 16, polymer II was employed to prepare a printing plate. A solid step 4 was obtained.

What is claimed is:

1. A graft polymer comprising a polyurethane backbone and grafted-on chains which comprise units of vinyl alcohol and units with styrylpyridinium or styrylquinolinium groups that are lateral with respect to said grafted-on chains.

2. A graft polymer as claimed in claim 1, wherein said grafted-on chains further comprise vinyl ester units.

3. A graft polymer as claimed in claim 2, wherein said vinyl ester units have 3 to 20 carbon atoms.

4. A graft polymer as claimed in claim 1, wherein said grafted-on chains further comprise vinyl acetal units.

5. A graft polymer as claimed in claim 4, wherein said vinyl acetal units are derived from an aliphatic or cycloaliphatic aldehyde.

6. A graft polymer as claimed in claim 1, wherein said units containing styrylpyridinium or styrylquinolinium groups correspond to the general formula I

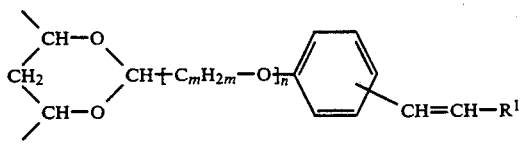

in which
R¹ denotes one of the groups

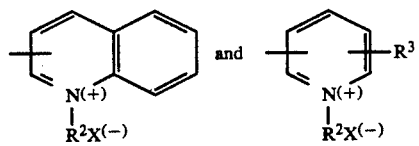

m denotes an integer from 1 to 6,
n denotes 0 or 1,
R² hydrogen or an alkyl, alkenyl or aralkyl group,
R³ denotes hydrogen or an alkyl group and
X denotes the anion of the nitrogen base.

7. A graft polymer as claimed in claim 1, wherein said polyurethane is a polyaddition product obtained from diisocyanates and diols.

8. A graft polymer as claimed in claim 7, wherein the molar ratio of diols to diisocyanates is between about 1:0.99 and 1:0.5.

9. A graft polymer as claimed in claim 1, wherein the average molecular weight of said polyurethane is between about 200 and 100,000.

10. A graft polymer as claimed in claim 1, wherein said grafted-on chains further comprise units with terminal polymerizable or crosslinkable double bonds.

11. A graft polymer as claimed in claim 10, wherein said units with terminal double bonds contain acryloyl or methacryloyl groups.

12. A graft polymer as claimed in claim 1, wherein said grafted-on chains further comprise units with carboxyl or sulfonylurethane groups.

13. A graft polymer as claimed in claim 1, wherein said grafted-on chains further comprise units of at least one additional ethylenically unsaturated and copolymerizable monomer.

14. A graft polymer as claimed in claim 13, wherein said copolymerizable monomer is an acid.

15. A graft polymer as claimed in claim 1, wherein the proportion of grafted-on components is about 10 to 95 wt%, based on the total graft polymer.

16. A photocurable mixture comprising a graft polymer as claimed in claim 1 and a photosensitive substance.

17. A photocurable mixture as claimed in claim 16, wherein said photosensitive substance is a compound or a combination of compounds, which upon irradiation with actinic light is capable of initiating or sensitizing the crosslinking of the ethylenically unsaturated lateral chains of said graft polymer.

18. A photocurable mixture as claimed in claim 17, further comprising a low molecular-weight, ethylenically unsaturated, free-radically polymerizable compound, wherein said photosensitive substance is also capable of initiating the free-radical polymerization of the ethylenically unsaturated compound upon irradiation with actinic light.

19. A photocurable mixture as claimed in claim 16, wherein said photosensitive substance is a diazonium salt polycondensation product.

20. A photocurable mixture as claimed in claim 17, comprising about 20 to 90% by weight of said graft polymer, about 0.01 to 20% by weight of said photosensitive substance and about 0 to 80% by weight of low molecular weight, polymerizable compound.

21. A photocurable mixture as claimed in claim 16, consisting essentially of the recited ingredients.

22. A photocurable recording material comprising a support for a photosensitive layer and a photosensitive recording layer, wherein said layer comprises a mixture as claimed in claim 16.

23. A photocurable recording material comprising a support for a photosensitive layer and a photosensitive recording layer, wherein said layer consists essentially of a mixture as claimed in claim 21.

24. A graft polymer comprising a polyurethane graft backbone and grafted-on chains which comprise
 (a) about 0.5 to 50 mole % of units containing lateral styrylpyridinium or styrylquinolinium groups corresponding to the general formula I

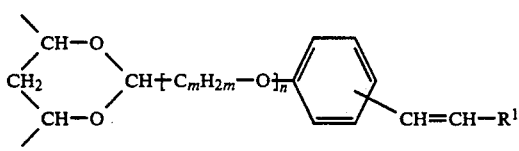 (I)

in which
R¹ denotes one of the groups

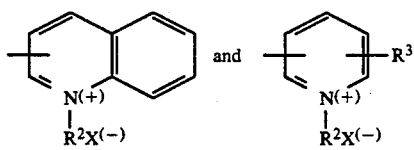 and m denotes an integer from 1 to 6,
n denotes 0 or 1,
R² denotes hydrogen or an alkyl, alkenyl or aralkyl group,
R³ denotes hydrogen or an alkyl group and
X denotes the anion of the nitrogen base,
(b) about 5 to 90 mole % of vinyl alcohol units,
(c) about 0 to 85 mole % of vinyl acetal units, and
(d) about 0 to 45 mole % of vinyl ester units of saturated aliphatic or aromatic carboxylic acids, wherein all mole percentages relate to the content of the polymer of grafted-on units.

25. A graft polymer as claimed in claim 24, wherein said grafted-on chains comprise about 1 to 20 mole % of component (a), about 10 to 70 mole % of component (b), about 0 to 70 mole % of component (c) and about 1 to 25 mole % of component (d).

26. A graft polymer as claimed in claim 24, consisting essentially of the recited components.

27. A photocurable mixture comprising a graft polymer as claimed in claim 24 and a photosensitive substance.

28. A photocurable recording material comprising a support for a photosensitive layer and a photosensitive recording layer, wherein said layer comprises a mixture as claimed in claim 25.

* * * * *